US009921875B2

(12) United States Patent
Tsirkin (10) Patent No.: US 9,921,875 B2
(45) Date of Patent: Mar. 20, 2018

(54) ZERO COPY MEMORY RECLAIM FOR APPLICATIONS USING MEMORY OFFLINING

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/723,265

(22) Filed: May 27, 2015

(65) Prior Publication Data

US 2016/0350233 A1 Dec. 1, 2016

(51) Int. Cl.
*G06F 12/10* (2016.01)
*G06F 9/50* (2006.01)
*G06F 12/02* (2006.01)

(52) U.S. Cl.
CPC ............ *G06F 9/50* (2013.01); *G06F 12/0223* (2013.01)

(58) Field of Classification Search
CPC ............ G06F 12/10; G06F 2212/1044; G06F 2212/657
See application file for complete search history.

(56) References Cited

U.S. PATENT DOCUMENTS

| 5,535,381 | A * | 7/1996 | Kopper | G06F 3/0601 710/52 |
|---|---|---|---|---|
| 7,330,862 | B1 * | 2/2008 | Srinivasan | G06F 12/0866 |
| 7,403,974 | B1 | 7/2008 | Harris | |
| 7,454,477 | B2 | 11/2008 | Talluri et al. | |
| 7,526,577 | B2 | 4/2009 | Pinkerton et al. | |
| 7,849,274 | B2 | 12/2010 | Pittman | |
| 8,250,586 | B2 | 8/2012 | Nelson | |
| 8,443,051 | B2 * | 5/2013 | Siddabathuni | G06F 13/28 709/212 |
| 8,490,207 | B2 | 7/2013 | Layton et al. | |
| 8,701,126 | B2 | 4/2014 | van Riel | |
| 2009/0083392 | A1 * | 3/2009 | Wong | H04L 67/1097 709/212 |
| 2014/0129635 | A1 * | 5/2014 | Hefty | G06F 13/14 709/204 |

(Continued)

OTHER PUBLICATIONS

Carl A. Waldspurger. 2002. Memory resource management in VMware ESX server. SIGOPS Oper. Syst. Rev. 36, SI (Dec. 2002), 181-194.*

(Continued)

*Primary Examiner* — Ramon A Mercado
(74) *Attorney, Agent, or Firm* — Lowenstein Sandler LLP (57) ABSTRACT

An application sends a first request to an operating system to provide a hardware device with direct memory access to contents of a virtual memory location in an application memory of the application, wherein the virtual memory location is mapped to a physical memory location. In response to determining that the virtual memory location is to be reclaimed, the application sends a second request to the operating system to unmap the physical memory location from the virtual memory location. The second request causes the virtual memory location to be mapped to a new physical memory location. Responsive to receiving an indication from the operating system that the request to unmap the physical memory location has completed, the application then accesses the new physical memory location mapped to the virtual memory location.

20 Claims, 6 Drawing Sheets

(56) References Cited

U.S. PATENT DOCUMENTS

2014/0195632 A1 7/2014 Hunter et al.
2014/0195739 A1 7/2014 Yu et al.

OTHER PUBLICATIONS

Michael Calhoun, "Characterization of Block Memory Operations," Rice University, Apr. 2006, 86 pages, Houston, Texas, Internet: <http://www.cs.rice.edu/CS/Architecture/docs/msthesis-calhoun.pdf>.

Hamid Reza Mohebbi et al., "ZIVM: A Zero-Copy Inter-VM Communication Mechanism for Cloud Computing," Computer and Information Science, Nov. 2011, pp. 18-27, vol. 4, No. 6, Canadian Center of Science and Education.

Greg Hartman, "Virtual Memory in Today's Operating Systems," [retrieved May 21, 2015], 21 pages, Internet: <http://www.cs.cmu.edu/~gghartma/sssg-vm-intro.pdf>.

\* cited by examiner

ZERO COPY MEMORY RECLAIM FOR APPLICATIONS USING MEMORY OFFLINING

TECHNICAL FIELD

The present disclosure is generally related to zero copy memory techniques and, more specifically, to reclaiming zero copy memory using memory offlining.

BACKGROUND

In traditional networking, data is transferred from a memory page allocated to an application to a socket buffer for transmission by a network interface controller (NIC) to a remote device. The socket buffer is typically maintained in memory to which the NIC can get direct memory access (DMA). The act of copying the data from the memory page allocated to the application to the socket buffer directly accessible to the NIC introduces transport overhead.

To mitigate the transport overhead introduced by copying the data from the memory page allocated to the application to the socket buffer, some protocols use a zero copy technique. In the zero copy technique, the NIC is granted direct memory access to the memory page that is in use by the application. Until the NIC completes transmission of the data from the memory page, the application can neither release the memory page nor modify the physical memory location. In some instances, there may be a significant delay between when the NIC is granted DMA to the memory page and when the NIC transmits the data at the memory page. Accordingly, the use of zero copy techniques for transmitting data can be problematic.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are a method and system for providing zero copy transmission of memory page contents without preventing the memory page from being modified. To implement zero copy transmission of a memory page's contents, the memory page is locked or pinned, thus ensuring that the memory page will not be paged out or moved to a new physical location until after the zero copy transmission is complete. Locking or pinning the memory page means that the memory page is prevented from being swapped out to secondary storage. While this can be a useful technique for network transmission, a concern with this approach is that an application may suffer performance degradation by waiting for NIC with unpredictable latency to process a request. A NIC that is overburdened with requests, malfunctioning, or otherwise slow in processing can take unlimited time to process requests, which can not only prevent an application from reusing memory space, but can also result in an application running out of memory.

Aspects of the present disclosure address the above noted and other deficiencies by implementing application-based requests to reclaim memory rather than wait for the operating system to conduct memory management on the application's behalf. The application can monitor its memory state using a timer or a memory threshold, and subsequently send a request to the operating system to offline portions of memory that are locked due to pending zero copy transmission requests.

In an illustrative example, an application sends a request to an operating system to provide a hardware device with direct memory access to contents of a memory location. The memory location may be a virtual memory location in an application memory area allocated to the application that is mapped to a corresponding physical memory location. For example, the application may send a request to the operating system for a network interface controller (NIC) to perform a zero copy transmission of contents of the memory location. The application may be one or more computer programs designed to permit a user to perform a group of coordinated functions, tasks, or activities. The application may be may be traditional applications such as word processing applications, server applications, spreadsheet applications, and the like. The application may execute via an operating system layer. The operation system provides an interface between the application program and computer hardware as well as other resources available to the application, such as memory management. In a virtualized environment, the application may be a virtual machine (VM) that sends the request to a hypervisor of a host operating system.

In some instances, there can be a delay between when an application sends the request and when the NIC completes the zero copy transmission. For example, if the zero copy transmission is performed by a low priority process while a higher priority process is sending and/or receiving data, no or few system resources may be allocated to the NIC for the zero copy transmission until the higher priority process completes its operations. This may occur, for example, if a zero copy transmission is performed for a database application while a high priority latency sensitive application (e.g., a voice over internet protocol (VOIP) application) is executing. Thus, the zero copy transmission may be starved of system resources. As a result, the physical memory location (and virtual memory location mapped to that physical memory location) may remain locked and unchangeable for an indeterminate amount of time, during which the memory location may not be modified or used for other purposes.

The application may then determine whether the virtual memory location is to be reclaimed by the application. The application may make this determination in order to prevent the application from stalling as a result of a zero copy transmission. In some implementations, the application may determine whether the virtual memory location is to be reclaimed by implementing a timer. For example, upon sending the zero copy request to the operating system, the application may start a timer associated with the request. The timer may be used to determine whether the zero copy transmission is taking too long to complete (e.g., if the NIC is malfunctioning, overburdened with requests, etc.). Any time before the timer expires, the NIC may complete the transmission and send a notification to the operating system indicating transmission completion, which can subsequently cause the operating system to unlock the virtual memory page. However, if the application detects that the timer has expired prior to completion of the zero copy transmission, then the application may determine that the virtual memory location is to be reclaimed by the application so the application may reuse and/or modify the memory.

Alternatively, the application may determine that the virtual memory location is to be reclaimed by using a memory threshold. The memory threshold may be used to set a maximum amount of memory from the application's memory space that can be allocated to zero copy requests before the application submits a request to reclaim memory. The memory threshold may be defined as a total amount of memory used, a total number of memory pages used, a total number of requests submitted, or in any similar manner. After submitting a request, the application may increment a counter or accumulator that can be used to monitor the total amount of memory allocated to pending zero copy requests. If the threshold is measured as a total amount of memory, an accumulator can be used to add the amount of memory for the page associated with the request each time a request is submitted. If the threshold is measured as a number of pages or a number of requests, a counter can be used and incremented each time a request is submitted. Upon submitting a request, the application may determine the amount of virtual memory that has been allocated to all pending zero-copy requests (e.g., by checking the size of the counter or accumulator). If the application determines that the amount of memory allocated to all pending zero copy requests meets a predetermined threshold condition (e.g., the total amount of memory, total number of pages, etc.), the application may determine that the virtual memory location is to be reclaimed by the application so the application may reuse the memory.

In response to determining that a virtual memory location is to be reclaimed, the application may send a request to the operating system to offline the memory used by the zero copy request. The request may be sent to the operating system using an operating system call, an API call to another application, or in any similar manner. Offlining the memory can remove the ability to modify the specific physical memory page from the application. The physical memory page may remain accessible to the NIC until the NIC has completed processing the zero copy request. The request to offline the memory can be a request to unmap the physical memory location from the virtual memory location, causing the virtual memory location to be mapped to a new physical memory location. In an illustrative example, the request to offline the memory can be a request to discard the physical memory location mapped to the virtual memory location of the application. On the next access of the virtual memory page address by the application (or the virtual machine), the operating system can provide the application (or the virtual machine) with a new physical page without any of the data from the old physical memory page.

In another illustrative example, the request to offline the memory can be a request to archive the physical memory location mapped to the virtual memory location of the application to a data store. The physical memory page may first be unmapped from the virtual memory page (as noted above), then the operating system may copy the data from the physical memory page to a data store located on a physical disk drive, database, shared memory, or the like. Upon next access of the virtual memory page by the application (or the virtual machine), the operating system (or the hypervisor) can then retrieve the copy from the data store to provide to the application (or the virtual machine).

In another illustrative example, the request to offline the memory can be a request to copy the physical memory location mapped to the virtual memory location to another physical memory location. The operating system (or the hypervisor) can create an exact copy of the physical memory page and map the copy to the virtual memory page of the application (or the virtual machine). The copy operation can be completed immediately upon request by the application (or the virtual machine). Alternatively, the operating system (or the hypervisor) may complete the copy operation once the application (or the virtual machine) attempts to access the virtual memory page associated with the request.

In another illustrative example, the request to offline the memory can be a request to implement a copy-on-write policy for the physical memory location mapped to the virtual memory location of the application. This can enable the application using the memory page to modify the contents of the memory page without corrupting the data being transmitted. Implementing a copy-on-write memory mapping policy may involve mapping of the same physical memory page into address spaces of one or more application and/or hardware device (e.g., a NIC) which may be unaware of the shared use of the memory page. A memory page in a copy-on-write state may be write-protected, so that an attempt to modify the page would cause a page fault. When the application or hardware device sharing a copy-on-write memory page attempts to modify the shared memory page, a page fault exception is triggered, and a copy of the page is created and mapped into the address space of the application (or the virtual machine), so that the application or hardware device would modify the newly created copy. The mapping is transparent to both an application attempting the memory page modification and a hardware device (e.g., NIC) that has direct memory access to the memory page.

Accordingly, when the application attempts to modify the virtual memory location, a copy of the physical memory location mapped to the virtual memory location is created and mapped to the virtual memory location in the address space of the application. The contents of the virtual memory location (and thus of the new physical memory location) is then modified in accordance with the application's access request. The mapping is transparent to both the application attempting the memory location modification and the NIC sharing the physical memory location. Once the NIC completes the data transfer, the copy-on-write policy (and thus write protection) may be removed from the virtual memory location. The physical memory location may then be reclaimed in standard garbage collection for reuse.

After completing the offline request for the memory location, the operating system can then unpin/unlock the virtual memory location from the physical memory location without risk that the contents of the physical memory location will change prior to those contents being transmitted to a remote computing device. The virtual memory location may not initially have a copy-on-write policy (and so may not initially be write protected) because write protecting a memory location is typically a slow operation. To write protect a virtual memory location, one or multiple caches are first flushed to ensure that the contents of the physical memory location mapped to that virtual memory location are accurate and not stale. Accordingly, by waiting until a request to reclaim the memory page is received to implement the write protection, write protection is only performed for memory pages for which there is a delay. Delays should be rare, and so only a small fraction of memory pages will be write protected in most instances Once the operating system (or the hypervisor) has completed the offline request received from the application (or the virtual machine) and unmapped the memory, a notification may be sent to the application (or the virtual machine). Responsive to receiving an indication from the operating system that the request to unmap the physical memory location has completed, the application may then access the new physical memory location that has been mapped to the virtual memory location. The operating system may notify the application using a return code response to the system call, an interrupt, data written to a shared memory space, or in any similar manner.

Aspects of the present disclosure are thus capable of implementing application-based requests to reclaim memory rather than wait for the operating system to conduct memory management on the application's behalf. More particularly, the application can monitor its memory state using a timer or a memory threshold, and subsequently send a request to the operating system to offline portions of memory that are locked due to pending zero copy transmission requests. Thus, the application can continue processing without impacting pending zero copy transmission requests, reducing the possibility that the application could exhaust available memory.

Figure 1:
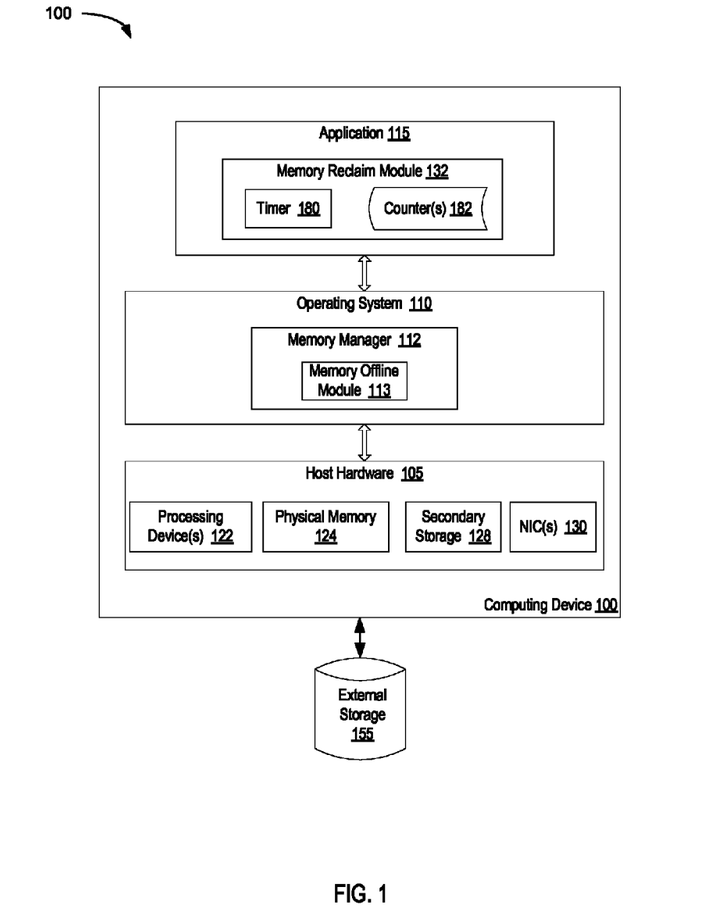
FIG. 1 depicts a high-level component diagram of an example computing device that hosts one or more applications, in accordance with one or more aspects of the present disclosure.

FIG. 1 depicts a high-level component diagram of an illustrative example of a computing device 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, computing device 100 (e.g., a host machine) hosts one or more applications 115, an operating system (OS) 110, and includes host hardware 105. The computing device 100 may be a rackmount server, a workstation, a desktop computer, a notebook computer, a tablet computer, a mobile phone, a palm-sized computing device, a personal digital assistant (PDA), etc. The computing device 100 includes host hardware 105, which may include one or more processing devices 122, physical memory 124, secondary storage 128, one or more network interface controllers 130 (NICs, also referred to as network interface cards), and other hardware components (e.g., I/O devices).

Processing device 122 represents one or more general-purpose processing devices such as a microprocessor, central processing unit, or the like. More particularly, the processing device 122 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 122 may also be one or more special-purpose processing devices such as an application specific integrated circuit (ASIC), a field programmable gate array (FPGA), a digital signal processor (DSP), network processor, or the like. The physical memory 124 may include volatile memory devices (e.g., random access memory (RAM)), non-volatile memory devices (e.g., Flash memory, read only memory (ROM), etc.), and/or other types of memory devices. The secondary storage 128 may include mass storage devices, such as magnetic or optical storage based disks, tapes and/or hard drives. NIC 130 is a device capable of implementing a physical layer and data link layer standard (such as Ethernet or InfiniBand). The host hardware 105 may also be coupled to external storage 155 via a direct connection or a local network. The computing device 100 may be a single machine or multiple host machines arranged in a cluster.

Applications 115 may be traditional applications such as word processing applications, server applications, spreadsheet applications, and so on. The applications may additionally be virtual machines (VMs). Applications 115 may include memory reclaim module 132 that can implement application-based requests to reclaim memory, as described below in further detail with respect to FIGS. 3-4. Memory reclaim module 132 may include a timer 180 and counters 182. Timer 180 may be used to determine whether the zero copy transmission is taking too long to complete. Counters 182 can include counters and/or accumulators used in comparing memory used for zero copy requests in relation to a memory threshold.

Operating system 110 manages the host hardware 105 as well as software resources, and provides services for applications 115. In some implementations, OS 110 includes a memory manager 112. Memory manager 112 is responsible for managing the allocation of memory (e.g., physical memory and/or virtual memory) for the operating system 110, for applications 115, and for hardware devices (e.g., NICs 130). Memory manager 112 may perform operations such as allocating memory, mapping physical memory locations (e.g., physical memory pages) to virtual memory locations (e.g., virtual memory pages), freeing up unused memory locations (e.g., performing garbage collection on unused memory pages), and so on. Memory manager 112 may separate physical memory from virtual memory to effectively increase the amount of available memory through the use of paging (or swapping) some memory to secondary storage 128. Each application 115 may have its own virtual memory space of contiguous virtual memory addresses. Each virtual memory address maps to a physical address either in physical memory 124 or in a swap space in secondary storage 128.

Memory manager 112 in some instances grants direct memory access (DMA) of physical memory locations to hardware devices (e.g., to NICs 130, secondary storage 128, graphics cards, sound cards, other physical memory, processing devices, etc.). DMA enables a hardware device to access physical memory 124 independently of processing device 122. Without DMA, the processing device 122 is typically utilized for reading to or writing from a memory location in physical memory until the read or write is complete, and thus is unable to perform other operations during this time. In contrast, the use of DMA enables the processing device 122 to initiate the read or write operation, and let the hardware device communicate directly with the physical memory location for the duration of the read or write process. The processing device 122 may then perform other operations while the read or write is being performed. Once the hardware device completes the read or write operation, a DMA controller (not shown) may issue an interrupt to the processing device to notify the processing device that the read or write operation is complete. The use of DMA may significantly reduce the processor overhead associated with transferring data in and out of physical memory 124.

Many operations (e.g., read and write operations) involve processing device 122 and/or other hardware devices copying data from one physical memory location in physical memory 124 to another physical memory location in physical memory 124. For example, in order for an NIC 130 to transfer data to a remote computing device, that data would initially be transferred from a physical memory location mapped to a virtual memory space of an application 115 to a data buffer (e.g., a socket buffer) before transmission. The data buffer is a region of physical memory 124 used to temporarily store data while that data is being moved from one location to another. A hardware device such as NIC 130 may have direct memory access to the data buffer, thus reducing processor overhead. However, overhead is still introduced by the process of copying the data from the memory space of the application 115 to the data buffer.

To further reduce transport overhead, memory manager 112 provides zero-copy data transfer capability. A zero-copy operation is an operation in which data is not copied into a data buffer during the operation. For example, for a zero-copy data transfer data is not copied into a socket buffer prior to the NIC 130 transmitting that data to a remote computing device. Instead, memory manager 112 grants for NIC 130 direct memory access (DMA) to the physical memory locations holding the data, which may be allocated to an application 115. This enables the NIC to directly access the physical memory locations storing the data without the processing device 122 making any copies of the data, which further reduces transport overhead.

Memory manager 112 should ensure that the data in the physical memory location does not change during a zero copy transmission. Accordingly, memory manager 132 typically locks or pins a virtual memory page to physical memory (e.g., to a physical memory page). While the virtual memory page is pinned or locked to a physical memory page that virtual memory page will not be swapped out to secondary storage or mapped to a different physical memory page Memory manager 112 can additionally include memory offline module 113 that can receive and process requests from an application 115 to offline memory associated with a zero-copy request. Memory offline module 113 can offline the memory by unmapping the physical memory location from the virtual memory location associated with application 115. Memory offline module can perform the memory offline operations by discarding the physical memory location mapped to the virtual memory location of application 115, archive the physical memory location mapped to the virtual memory location to a data store, copy the contents of the physical memory location to another physical memory location, implement a copy-on-write policy for the physical memory location, or in any similar manner.

Figure 2:
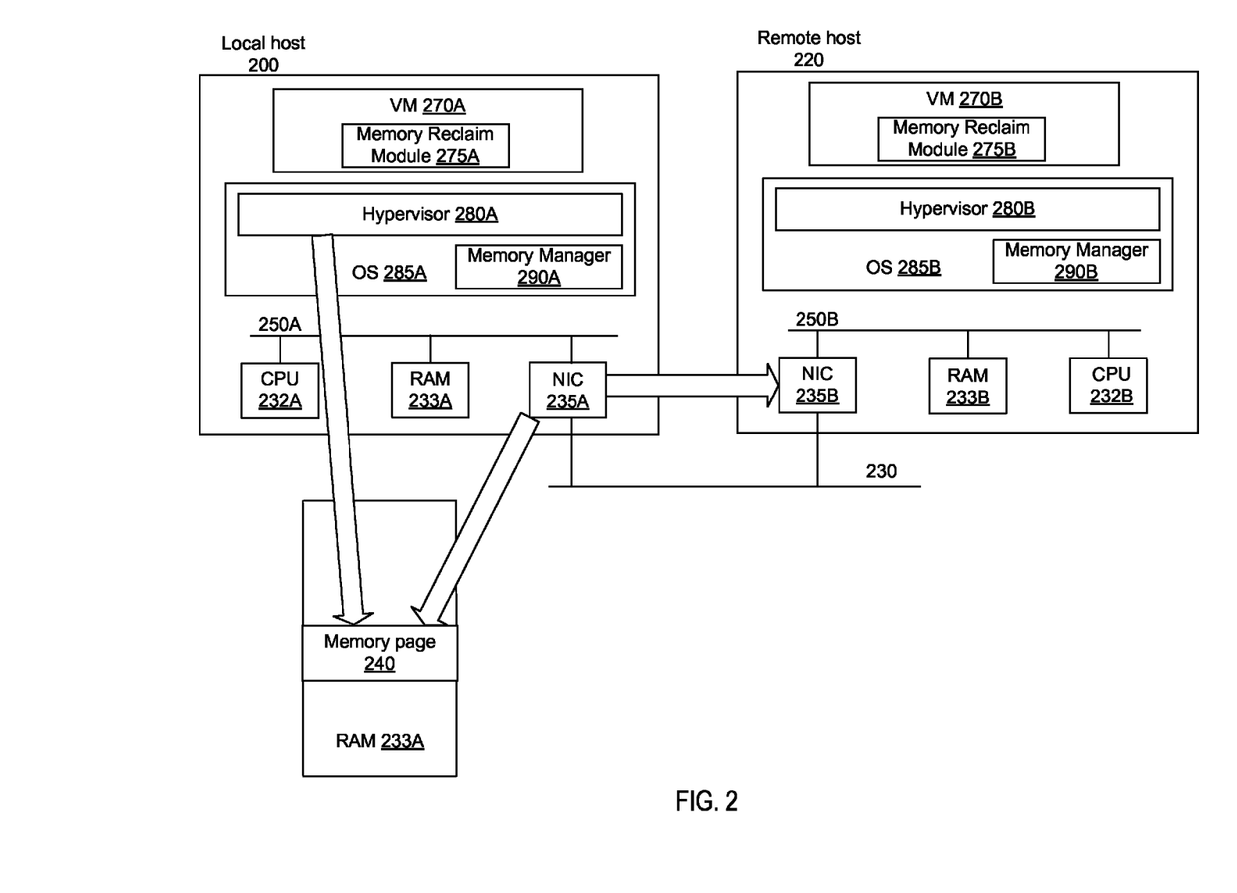
FIG. 2 depicts a block diagram that illustrates an embodiment of a NIC of a local host that performs a zero copy transmission of data to a remote host, in accordance with one or more aspects of the present disclosure.

FIG. 2 depicts a block diagram that illustrates an embodiment of a NIC 235A of a local host 200 that performs a zero copy transmission of data to a remote host 220. Local host 200 may be interconnected, via a network 230, with remote host 220. Local host 200 may comprise one or more processing devices (e.g., central processing unit (CPU) 232A) communicatively coupled to a memory device (e.g., random access memory (RAM) 233A) and a network interface controller (NIC) 235A. Local connections within local host 200, including connections between CPU 232A, RAM 233A, and NIC 235A, may be provided by one or more local buses 250A of a suitable architecture.

In an illustrative example, as schematically illustrated by FIG. 2, local host 200 may run multiple virtual machines (VMs) 270A by executing a software layer between the hardware and the virtual machines. The software layer is a hypervisor 280A, also known as a virtual machine monitor (VMM). In certain implementations, hypervisor 280A may be a component of operating system 285 executed by local host 200. Alternatively, hypervisor 280A may be provided by an application running under host operating system 285, or may run directly on the local host 200 without an operating system beneath it. Hypervisor 280A may abstract the physical layer, including processors, memory, and I/O devices, and present this abstraction to virtual machines 270A as virtual devices, including virtual processors, virtual memory, and virtual I/O devices. In another illustrative example (e.g., as shown in FIG. 1), local host 200, instead of executing virtual machines 270A, may run one or more non-virtualized applications on operating system 285A.

Local host 200 hosts any number of virtual machines (VM) 270A (e.g., a single VM, one hundred VMs, etc.). A virtual machine is a combination of guest software that uses an underlying emulation of the host machine (e.g., as provided by hypervisor 280A). The guest software may include a guest operating system, guest applications, guest device drivers, etc. Virtual machines 270A can be, for example, hardware emulation, full virtualization, para-virtualization, and operating system-level virtualization virtual machines. The virtual machines may have the same or different guest operating systems, such as Microsoft® Windows®, Linux®, Solaris®, etc.

Remote host 220 may be another host machine similar to local host 200. Remote host 220 may include a hardware layer including one or more processing devices (e.g., CPU 232B), memory (e.g., RAM 233B), and a NIC 235B connected via one or more local buses 250B. Remote host 220 may additionally include an operating system 285B, a hypervisor 280B hosting one or more virtual machines 270B, a memory manager 290B, and so on. Remote host 220 may be substantially similar to local host 200. Both local host 200 and remote host 220 may correspond to computing device 100 in embodiments.

Local host 200 and/or remote host 220 may include a memory manager 290A, 290B that implements a virtual memory system where pages of an address space of a process or a virtual machine are mapped to physical memory. Memory managers 290A-290B may be components of hypervisors or of operating systems. The address space virtualization may be handled through the processor's paging mechanism. Paging may support a virtual memory environment where a large linear address space is simulated with a smaller amount of random access memory (RAM) and some disk storage (swap space). Each memory segment may be divided into pages of a defined size (e.g., 4 KB) which may be stored either in physical memory or on the disk. The operating system may maintain a page directory and a set of page tables to keep track of the pages. When a process attempts to access an address location in the linear address space, the processor may use the page directory and page tables to translate the linear address into a physical address. If the page being accessed is not currently in physical memory, the processor may generate a page fault exception, and the operating system may then read the page from the disk and continue executing the thread. The processor may also generate a page fault exception if the memory page being accessed is write-protected (e.g., by setting a flag in the page table).

In certain implementations, local host 200 and/or remote host 220 may support zero copy transmissions. In such an implementation, memory manager 290A or memory manager 290B may perform one or more operations to facilitate the zero copy transmission responsive to a request from a guest of a VM 270A for NIC 235A to perform the zero copy transmission. For example, a physical memory page 240 may be mapped to a virtual memory space of VM 270A. Accordingly, VM 270A may have access to the physical memory page 240 via hypervisor 280A. NIC 235A may request to perform a zero copy transmission of the contents of a virtual memory page mapped to the physical memory page 240 to NIC 235B of remote host 220. Accordingly, memory manager 290A may grant direct memory access to the physical memory page 240 for NIC 235A. Alternatively, such access may already have been granted.

Virtual machines 270A and 270B may include memory reclaim module 275A, 275B that implements requests to reclaim memory associated with the zero copy transmission requests, as described below in further detail with respect to FIGS. 3-4. In some implementations, when VM 270A sends the zero copy request, memory reclaim module 275A may start a timer. If the timer expires before NIC 235A has transmitted the contents of physical memory page 240 to NIC 235B, then memory reclaim module 275A may send a request to hypervisor 280A to unmap the physical memory from the virtual memory (e.g., offline the memory). In response to this request, memory manager 290A removes the pin or lock on the virtual memory page and can offline the memory by discarding the physical memory location mapped to the virtual memory location of VM 270A, archive the physical memory location mapped to the virtual memory location to a data store, copy the contents of the physical memory location to another physical memory location, implement a copy-on-write policy for the physical memory location, or in any similar manner. This enables the VM 270A to request modifications to the virtual memory page mapped to physical memory page 240. Accordingly, VM 270A may perform additional operations that might alter the data in the virtual memory page without affecting the data that NIC 235A sends to NIC 235B.

Figure 3:
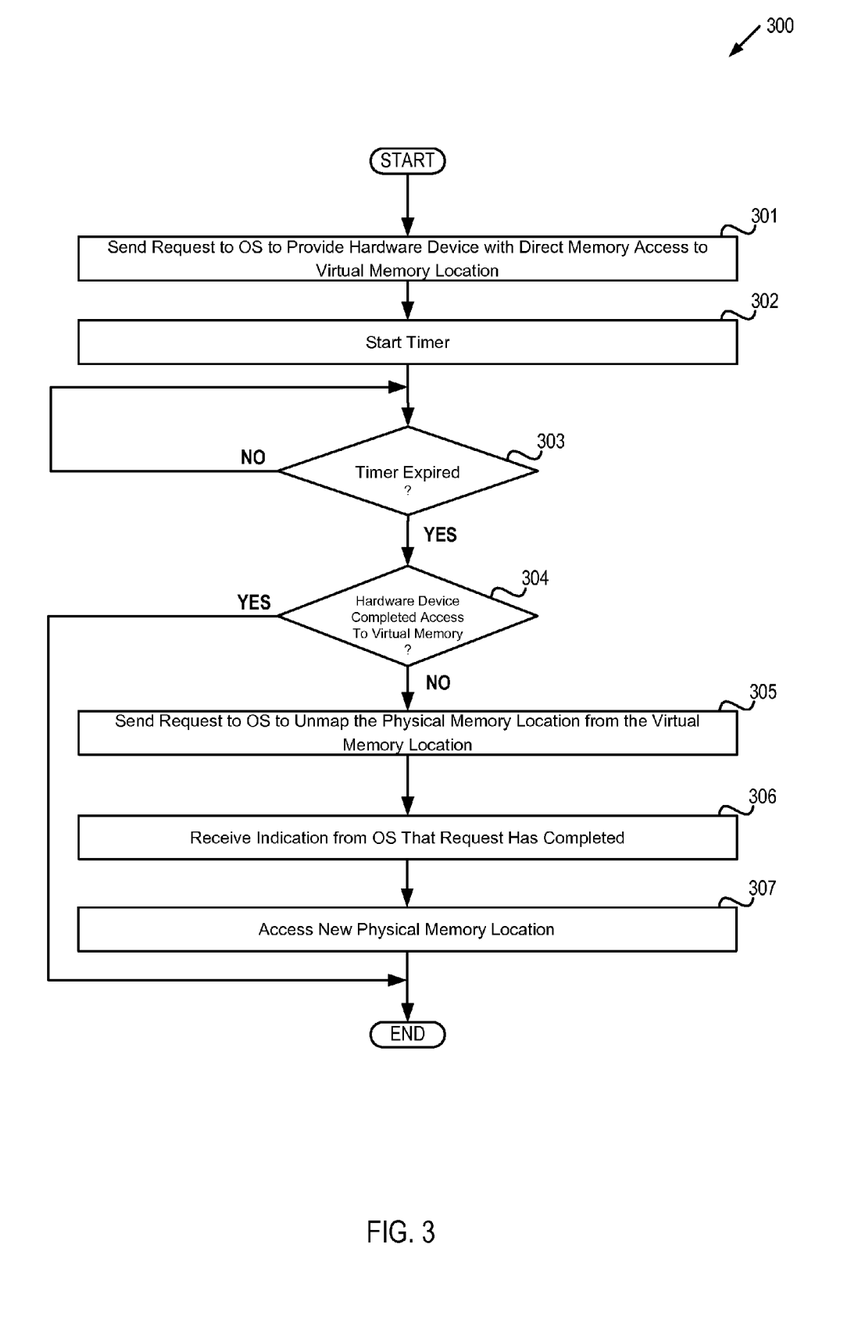
FIG. 3 depicts a flow diagram of a method for performing zero copy memory reclaim by an application using a timer, in accordance with one or more aspects of the present disclosure.

FIG. 3 depicts a flow diagram of an example method 300 for performing zero copy memory reclaim by an application using a timer. The method may be performed by processing logic that may comprise hardware (circuitry, dedicated logic, etc.), software (such as is run on a general purpose computer system or a dedicated machine), or a combination of both. In one illustrative example, method 300 may be performed by memory reclaim module 132 of application 115 in FIG. 1. Alternatively, some or all of method 300 might be performed by another module or machine. It should be noted that blocks depicted in FIG. 3 could be performed simultaneously or in a different order than that depicted.

At block 301, processing logic can send a request to an operating system to provide a hardware device with direct memory access to contents of a virtual memory location in an application memory of the application. For example, processing logic may send a request to the operating system for a network interface controller (NIC) to perform a zero copy transmission of contents of the memory location.

At block 302, processing logic starts a timer be used to determine whether the zero copy transmission is taking too long to complete. At block 303, processing logic determines whether the virtual memory location is to be reclaimed by the application by determining whether the timer has expired. If so, processing proceeds to block 304. Otherwise, processing continues checking the timer for expiration.

At block 304, processing logic determines whether the hardware device has completed access to the virtual memory location. If so, memory reclaim will not be required, and the method of FIG. 3 terminates. Otherwise, processing continues to block 305.

At block 305, processing logic sends a request to the operating system to unmap the physical memory location from the virtual memory location. The request can be a request to discard the physical memory location mapped to the virtual memory location of the application, a request to archive the physical memory location mapped to the virtual memory location of the application to a data store, a request to copy the physical memory location mapped to the virtual memory location to another physical memory location, a request to implement a copy-on-write policy for the physical memory location mapped to the virtual memory location of the application, or any other similar request.

At block 306, processing logic receives an indication from the operating system that the request to unmap the physical memory location from the virtual memory location has completed. At block 307, processing logic can access the new physical memory location mapped to the virtual memory location. The operating system may notify the application using a return code response to the system call, an interrupt, data written to a shared memory space, or in any similar manner. After block 307, the method of FIG. 3 terminates.

Figure 4:
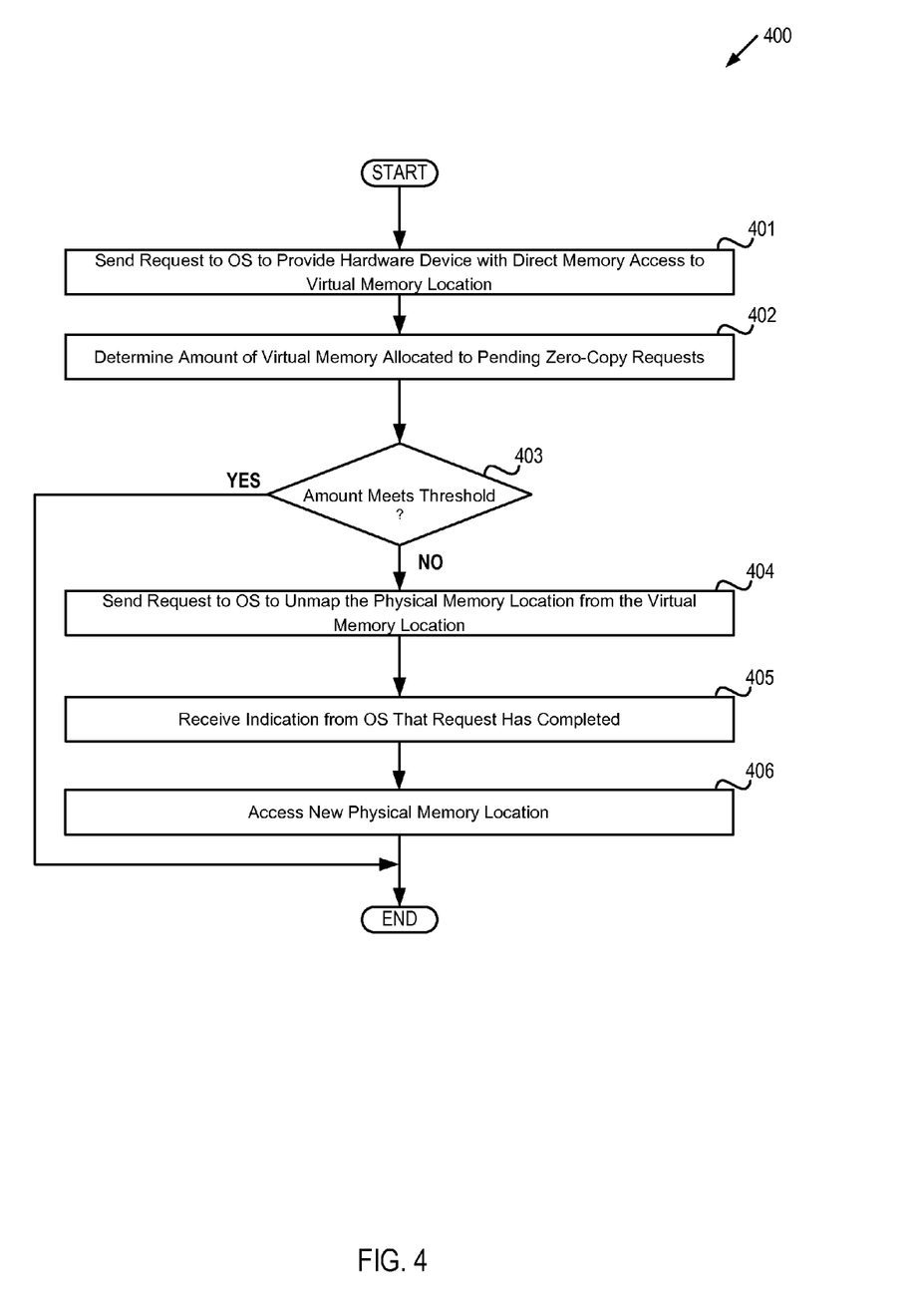
FIG. 4 depicts a flow diagram of a method for performing zero copy memory reclaim by an application using a memory threshold, in accordance with one or more aspects of the present disclosure.

FIG. 4 depicts a flow diagram of an example method 400 for performing zero copy memory reclaim by an application using a memory threshold. The method may be performed by processing logic that may comprise hardware (circuitry, dedicated logic, etc.), software (such as is run on a general purpose computer system or a dedicated machine), or a combination of both. In one illustrative example, method 400 may be performed by memory reclaim module 132 of application 115 in FIG. 1. Alternatively, some or all of method 400 might be performed by another module or machine. It should be noted that blocks depicted in FIG. 4 could be performed simultaneously or in a different order than that depicted.

At block 401, processing logic can send a request to an operating system to provide a hardware device with direct memory access to contents of a virtual memory location in an application memory of the application. For example, processing logic may send a request to the operating system for a network interface controller (NIC) to perform a zero copy transmission of contents of the memory location.

At block 402, processing logic determines an amount of memory from the application's memory space that has been allocated to zero copy requests. At block 403, processing logic determines whether the virtual memory location is to be reclaimed by the application by determining whether the amount of memory meets a predetermined threshold condition. If so, memory reclaim will not be required, and the method of FIG. 4 terminates. Otherwise, processing proceeds to block 404. The memory threshold may be defined as a total amount of memory used, a total number of memory pages used, a total number of requests submitted, or in any similar manner.

At block 404, processing logic sends a request to the operating system to unmap the physical memory location from the virtual memory location. The request can be a request to discard the physical memory location mapped to the virtual memory location of the application, a request to archive the physical memory location mapped to the virtual memory location of the application to a data store, a request to copy the physical memory location mapped to the virtual memory location to another physical memory location, a request to implement a copy-on-write policy for the physical memory location mapped to the virtual memory location of the application, or any other similar request.

At block 405, processing logic receives an indication from the operating system that the request to unmap the physical memory location from the virtual memory location has completed. At block 406, processing logic can access the new physical memory location mapped to the virtual memory location. The operating system may notify the application using a return code response to the system call, an interrupt, data written to a shared memory space, or in any similar manner. After block 406, the method of FIG. 4 terminates.

Figure 5:
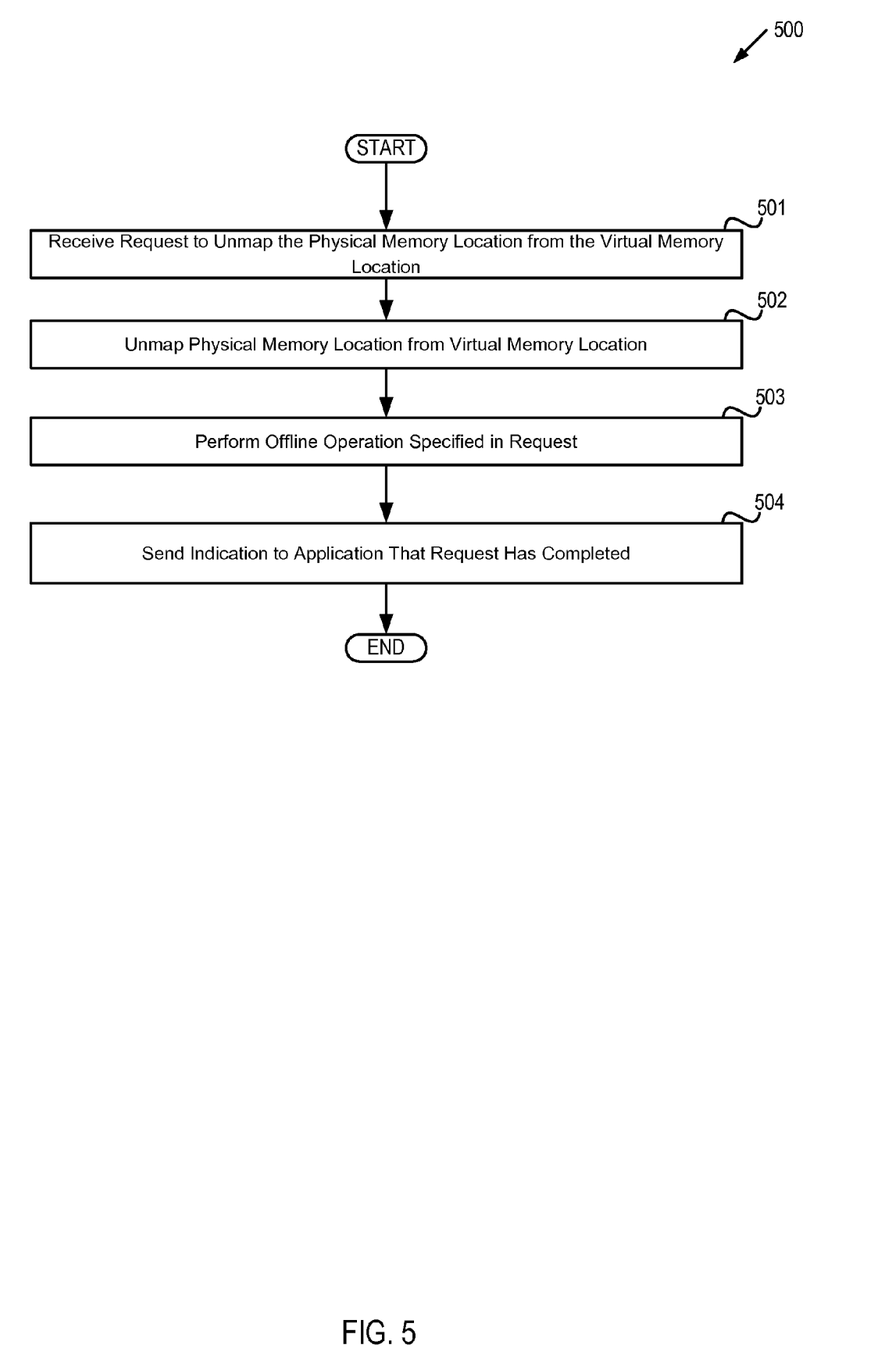
FIG. 5 depicts a flow diagram of a method for performing memory offlining operations upon receiving a request from an application, in accordance with one or more aspects of the present disclosure.

FIG. 5 depicts a flow diagram of an example method 500 for performing memory offlining operations upon receiving a request from an application. The method may be performed by processing logic that may comprise hardware (circuitry, dedicated logic, etc.), software (such as is run on a general purpose computer system or a dedicated machine), or a combination of both. In one illustrative example, method 300 may be performed by memory manager 112 of operating system 110 in FIG. 1. Alternatively, some or all of method 500 might be performed by another module or machine. It should be noted that blocks depicted in FIG. 5 could be performed simultaneously or in a different order than that depicted.

At block 501, processing logic receives a request from an application to unmap a physical memory location from a virtual memory location associated with a zero copy transmission request. The request may additionally include instructions to the operating system to perform a particular memory offline operation, as indicated above at block 305 of FIG. 3 and block 404 of FIG. 4.

At block 502, processing logic unmaps the physical memory location from the virtual memory location. At block 503, processing logic performs the memory offline operation received at block 501. At block 504, processing logic sends an indication to the application that the memory offline operation has completed. The operating system may notify the application using a return code response to the system call, an interrupt, data written to a shared memory space, or in any similar manner. After block 504, the method of FIG. 5 terminates.

Figure 6:
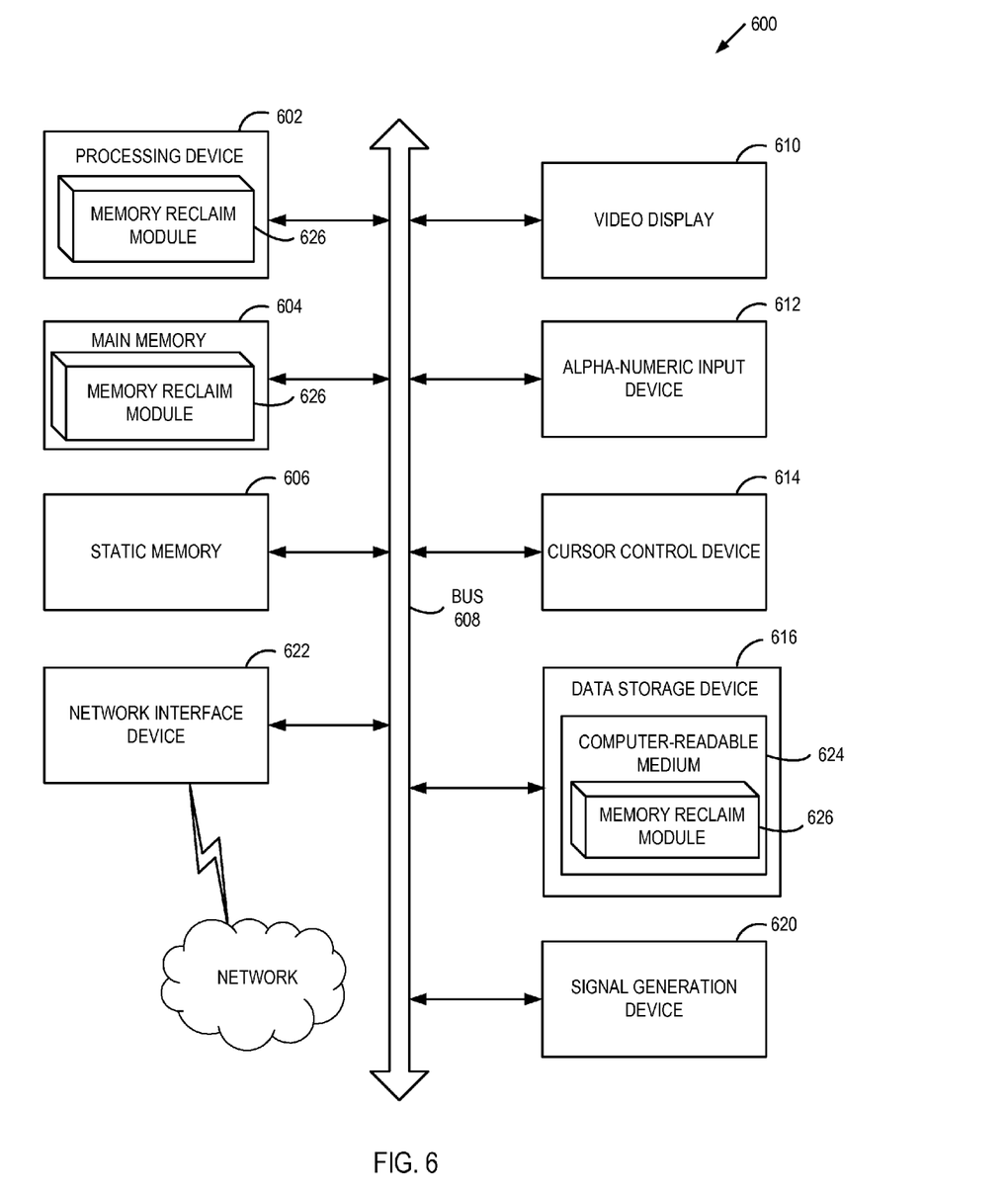
FIG. 6 depicts a block diagram of an illustrative computer system operating in accordance with examples of the invention.

FIG. 6 depicts an example computer system 600 which can perform any one or more of the methods described herein. In one example, computer system 600 may correspond to computing device 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 502 is configured to execute memory reclaim module 626 for performing the operations and steps discussed herein (e.g., corresponding to the methods of FIGS. 3-4, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored memory reclaim module 626 (e.g., corresponding to the methods of FIGS. 3-4, etc.) embodying any one or more of the methodologies or functions described herein. Memory reclaim module 626 may also reside, completely or at least partially, within the main memory 604 and/or within the processing device 602 during execution thereof by the computer system 600, the main memory 604 and the processing device 602 also constituting computer-readable media. Memory reclaim module 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "sending," "determining," "starting," "detecting," "submitting," "notifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

sending, by an application executed by a processing device, a first request to an operating system to provide a hardware device with direct memory access to contents of a virtual memory location in an application memory of the application, wherein the virtual memory location is mapped to a physical memory location;

monitoring, by the application, a total amount of virtual memory in the application memory of the application that is allocated to pending zero-copy requests;

determining, by the application, whether the virtual memory location is to be reclaimed by the application in view of the total amount of virtual memory in the application memory of the application that is allocated to the pending zero-copy requests;

in response to determining that the virtual memory location is to be reclaimed, sending, by the application, a second request to the operating system to unmap the physical memory location from the virtual memory location, the second request causing the virtual memory location to be mapped to a new physical memory location; and responsive to receiving an indication from the operating system that the second request to unmap the physical memory location has completed, accessing the new physical memory location mapped to the virtual memory location.

2. The method of claim 1, wherein the hardware device comprises a network interface controller (NIC), and wherein the first request to provide the hardware device with direct memory access to the contents of the virtual memory location comprises a request for zero copy transmission of the contents of the virtual memory location.

3. The method of claim 1, wherein determining that the virtual memory location needs to be reclaimed comprises:
   starting a timer upon sending the first request; and
   detecting an expiration of the timer prior to the completion of the first request.

4. The method of claim 1, wherein determining that the virtual memory location needs to be reclaimed comprises:
   upon submitting the first request, determining an amount of virtual memory allocated to pending zero-copy requests; and
   determining that the amount of virtual memory allocated to pending zero-copy requests meets a predetermined threshold condition.

5. The method of claim 1, wherein the second request comprises a request to discard the physical memory location mapped to the virtual memory location of the application.

6. The method of claim 1, wherein the second request comprises a request to archive the physical memory location mapped to the virtual memory location of the application to a data store.

7. The method of claim 1, wherein the second request comprises a request to copy the physical memory location mapped to the virtual memory location to another physical memory location.

8. The method of claim 1, wherein the second request comprises a request to implement a copy-on-write policy for the physical memory location mapped to the virtual memory location of the application.

9. A computing apparatus comprising:
   a memory; and
   a processing device, operatively coupled to the memory, to execute an application to:
      send a first request to an operating system to provide a hardware device with direct memory access to contents of a virtual memory location in an application memory of the application, wherein the virtual memory location is mapped to a physical memory location;
      monitor a total amount of virtual memory in the application memory of the application that is allocated to pending zero-copy requests
      in response to determining that the virtual memory location is to be reclaimed in view of the total amount of virtual memory in the application memory of the application that is allocated to the pending zero-copy requests, send, by the application, a second request to the operating system to unmap the physical memory location from the virtual memory location, the second request causing the virtual memory location to be mapped to a new physical memory location; and
      responsive to receiving an indication from the operating system that the second request to unmap the physical memory location has completed, access the new physical memory location mapped to the virtual memory location.

10. The apparatus of claim 9, wherein the hardware device comprises a network interface controller (NIC), and wherein the first request to provide the hardware device with direct memory access to the contents of the virtual memory location comprises a request for zero copy transmission of the contents of the virtual memory location.

11. The apparatus of claim 9, wherein to determine that the virtual memory location is to be reclaimed, the processing device is to:
   start a timer upon sending the first request; and
   detect an expiration of the timer prior to the completion of the first request.

12. The apparatus of claim 9, wherein to determine that the virtual memory location is to be reclaimed, the processing device is to:
   upon submitting the first request, determine an amount of virtual memory allocated to pending zero-copy requests; and
   determine that the amount of virtual memory allocated to pending zero-copy requests meets a predetermined threshold condition.

13. The apparatus of claim 9, wherein the second request comprises a request to discard the physical memory location mapped to the virtual memory location of the application.

14. The apparatus of claim 9, wherein the second request comprises a request to archive the physical memory location mapped to the virtual memory location of the application to a data store.

15. The apparatus of claim 9, wherein the second request comprises a request to copy the physical memory location mapped to the virtual memory location to another physical memory location.

16. The apparatus of claim 9, wherein the second request comprises a request to implement a copy-on-write policy for the physical memory location mapped to the virtual memory location of the application.

17. A non-transitory computer readable storage medium, having instructions stored therein, which when executed by a processing device of a computer system, cause the processing device to:
   send, by an application executed by the processing device, a first request to an operating system to provide a hardware device with direct memory access to contents of a virtual memory location in an application memory of the application, wherein the virtual memory location is mapped to a physical memory location;
   monitor, by the application, a total amount of virtual memory in the application memory of the application that is allocated to pending zero-copy requests
   determine, by the application executed by the processing device, whether the virtual memory location is to be reclaimed by the application in view of the total amount of virtual memory in the application memory of the application that is allocated to the pending zero-copy requests;
   in response to determining that the virtual memory location is to be reclaimed, send, by the application, a second request to the operating system to unmap the physical memory location from the virtual memory location, the second request causing the virtual memory location to be mapped to a new physical memory location; and
   responsive to receiving an indication from the operating system that the second request to unmap the physical memory location has completed, access the new physical memory location mapped to the virtual memory location.

18. The non-transitory computer readable storage medium of claim 17, wherein to determine that the virtual memory location is to be reclaimed, the processing device is to:
   start a timer upon sending the first request; and
   detect an expiration of the timer prior to the completion of the first request.

19. The non-transitory computer readable storage medium of claim 17, wherein to determine that the virtual memory location is to be reclaimed, the processing device is to:

upon submitting the first request, determine an amount of virtual memory allocated to pending zero-copy requests; and determine that the amount of virtual memory allocated to pending zero-copy requests meets a predetermined threshold condition.

20. The non-transitory computer readable storage medium of claim 17, wherein the second request comprises at least one of a request to discard the physical memory location mapped to the virtual memory location of the application, a request to archive the physical memory location mapped to the virtual memory location of the application to a data store, a request to copy the physical memory location mapped to the virtual memory location to another physical memory location, or a request to implement a copy-on-write policy for the physical memory location mapped to the virtual memory location of the application.

* * * * *